United States Patent
Rothschild (12)

(10) Patent No.: US 6,675,165 B1
(45) Date of Patent: Jan. 6, 2004

(54) METHOD FOR LINKING A BILLBOARD OR SIGNAGE TO INFORMATION ON A GLOBAL COMPUTER NETWORK THROUGH MANUAL INFORMATION INPUT OR A GLOBAL POSITIONING SYSTEM

(75) Inventor: Leigh M. Rothschild, Miami, FL (US)

(73) Assignee: Barpoint.com, Inc., Ft. Lauderdale, FL (US)

( * ) Notice: Subject to any disclaimer, the term of this patent is extended or adjusted under 35 U.S.C. 154(b) by 169 days.

(21) Appl. No.: 09/649,501

(22) Filed: Aug. 28, 2000

Related U.S. Application Data

(60) Provisional application No. 60/185,302, filed on Feb. 28, 2000.

(51) Int. Cl.⁷ .............................. G06F 17/30; G06F 7/00
(52) U.S. Cl. ........................................................ 707/10
(58) Field of Search ................................. 709/217, 219; 707/1, 3, 10, 100; 705/1, 26–27; 701/207, 213

(56) References Cited

U.S. PATENT DOCUMENTS

| | | | | |
|---|---|---|---|---|
| 5,528,248 A | * | 6/1996 | Steiner et al. | 342/357.06 |
| 5,699,244 A | | 12/1997 | Clark, Jr. et al. | 364/420 |
| 5,804,803 A | | 9/1998 | Cragun et al. | 253/375 |
| 5,913,210 A | | 6/1999 | Call | 707/4 |
| 5,933,829 A | | 8/1999 | Durst et al. | 707/10 |
| 5,938,721 A | | 8/1999 | Dussell et al. | 701/211 |
| 6,185,535 B1 | * | 2/2001 | Hedin et al. | 704/270 |
| 6,202,023 B1 | * | 3/2001 | Hancock et al. | 701/201 |
| 6,338,085 B1 | * | 1/2002 | Ramaswamy | 709/217 |
| 6,408,307 B1 | * | 6/2002 | Semple et al. | 707/104.1 |
| 6,429,813 B2 | * | 8/2002 | Feigen | 342/357.13 |

* cited by examiner

Primary Examiner—Greta Robinson
Assistant Examiner—Susan Rayyan
(74) Attorney, Agent, or Firm—Anthony J. Casella; Gerald E. Hespos

(57) ABSTRACT

An interactive search system for use primarily with a global computer network, e.g., the Internet, using geographic locations of advertising media to obtain a supply of product-related information for presentation to a user. A computing means may be used to access an implementing server containing a geo-coded database linking product and manufacturer information to geographic locations of advertising media relating to such product and manufacturer. Location data relating to a billboard or signage, whether located indoors or outdoors, can be entered into the computer through manual input of data relating to the city, state or zip code of the billboard. Alternatively, the location of the advertising media can be obtained by a location determination unit, such as a global positioning system (GPS) receiver. In a preferred embodiment, the computing means and location determination units are incorporated into a single device which accesses the implementing server though a two-way wireless communication link.

43 Claims, 2 Drawing Sheets

| | 50 | |
|---|---|---|
| 52 — | URL | WWW.HILTON.COM/AVENTURA |
| 54 — | KEYWORDS | BILLBOARD,HILTON RESORT,MIAMI |
| 56 — | CITY | MIAMI |
| 58 — | STATE | FLORIDA |
| 60 — | ZIP CODE | 33138 |
| 62 — | BLOCK | 45 |
| 64 — | LOT | 56 |
| 66 — | LATITUDE | 25.8552 (NORTH) |
| 68 — | LONGITUDE | 80.1846 (WEST) |

| | | |
|---|---|---|
| 52 — | URL | WWW.HILTON.COM/AVENTURA |
| 54 — | KEYWORDS | BILLBOARD,HILTON RESORT,MIAMI |
| 56 — | CITY | MIAMI |
| 58 — | STATE | FLORIDA |
| 60 — | ZIP CODE | 33138 |
| 62 — | BLOCK | 45 |
| 64 — | LOT | 56 |
| 66 — | LATITUDE | 25.8552 (NORTH) |
| 68 — | LONGITUDE | 80.1846 (WEST) |

METHOD FOR LINKING A BILLBOARD OR SIGNAGE TO INFORMATION ON A GLOBAL COMPUTER NETWORK THROUGH MANUAL INFORMATION INPUT OR A GLOBAL POSITIONING SYSTEM

CROSS-REFERENCE TO RELATED APPLICATION

This application is based on U.S. Provisional Application Ser. No. 60/185,302 which was filed on Feb. 28, 2000 and is entitled "METHOD OF LINKING A BILLBOARD OR SIGNAGE TO INFORMATION ON A GLOBAL COMPUTER NETWORK THROUGH MANUAL INFORMATION INPUT OR A GLOBAL POSITIONING SYSTEM", the disclosure of which is incorporated herein by reference This application is also based on International Application PCT/US00/01885, with an international filing date of Jan. 25, 2000, based on U.S. Provisional Application Ser. No. 60/118,051 filed on Feb. 1, 1999 and issued as U.S. Pat. No. 6,430,554 B1, the disclosure of which is incorporated herein by reference.

BACKGROUND OF THE INVENTION

1. Field of the Invention

The present invention relates to a system for searching an electronic network, such as the Internet, for product-specific information, more particularly, to a method and means by which a user can retrieve product-specific information through databases on a global network by inputting the location of a billboard or signage representing the information sought.

2. Description of the Related Art

Manufacturers must provide information about their products to resellers, consumers, and others. Resellers need product information to select, promote and support the products they distribute. Consumers need information about available products to make informed buying choices. Advertisers, product analysts, manufacturer's representatives, shippers and others also need information about the goods with which they deal.

Under current practices, product information typically originates with manufacturers and is primarily distributed in conventional print media, advertising and product packaging. This information is often incomplete, difficult to update, and available only to a limited distribution. Global electronic and computer networks, such as the Internet, permit manufacturers to make detailed, up-to-date product information available to all who are interested. However, it is difficult to investigate a particular product on a global computer network when the product is sold under more than one name, or when the user is not sure of the proper name of the product. Similarly, the user may not know who is the manufacturer of the products or may not know the Uniform Resource Locator (URL) of the manufacturer's website. It therefore can be quite a time-consuming and complex procedure to do an effective product search through all of the websites and databases available that may contain pertinent information.

To facilitate a product search on a network or the Internet, prior art patents discuss placing barcodes or other symbology adjacent to or as part of the content of advertising print that an information provider wants to link to a particular global computer network location. For example, U.S. Pat. No. 5,913,210 to C. G. Call, discloses a system involving the storing of a plurality of Universal Product Codes (UCPs) in respective computers with web addresses (URLs) and storing cross-references of the UPCs and URLs in another computer which can be accessed by further networked computers using the UPCs to find the respective URLs. Also, U.S. Pat. No. 5,804,803 to B. J. Cragun et al., discloses the retrieval of a document by a client computer system using a scanned UPC to create a URL location in a first server, from UPC and customer data retrieved from a second server, which URL may be used to obtain the document from the first server. Further, U.S. Pat. No. 5,933,829 to Robert T. Durst et al., discloses a system which utilizes a machine-readable code printed on a document to launch application software and retrieve an appropriate file by the use of a file location pointer encoded on the machine-readable code.

Although this is acceptable for a magazine or a one page flyer containing advertising content, it is not suitable for a billboard or signage that a user may be quickly passing and cannot scan the symbology with a hardware device or remember the symbology. Currently, there is no system which can link content provided on a computer network or the Internet with advertising media based on a location of where the advertising media is presented.

It is an object of the present invention to provide an interactive system whereby an individual can quickly and easily obtain a supply of the available information about a selected search object, such as a product and/or its manufacturers, from a global computer network.

It is another object of the present invention to provide an interactive method and means that enables an individual to search a global computer network and easily obtain a supply of information regarding a selected product without keying in an exact symbology.

It is a further object of the invention to provide an interactive system for searching a computer network whereby information regarding products and manufacturers can be quickly obtained, aggregate and stored for use based on the location of a billboard or sign advertising the product sought.

It is also an object of the present invention to provide an interactive system for quickly and easily obtaining a supply of information about selected products and/or its manufacturer or provider from a server comprising a geo-coded database which will link geographic advertising locations to the advertising content providers.

SUMMARY OF THE INVENTION

The above-stated objects are met by an interactive search system that is directed to interact primarily with global computer networks, particularly the Internet, using geographic locations of advertising media to rapidly and effectively obtain a supply of product-related information for presentation to a user. In accordance with the present invention, a suitable terminal, typically a desktop computer and modem connection, is used to access an implementing server containing a geo-coded database linking product and manufacturer information to geographic locations of advertising media related to such product and manufacturer. Information relating to a particular product and its manufacturer is obtained when a user enters location data relating to a billboard or signage in which the user has been exposed to outside their normal computing environment, i.e., the home or office. The location data can be entered into the computer through manual input of data relating to the city, an approximate location, or zip code of the billboard. Alternatively, the location of the advertising media can be obtained by a location determination unit. The location determination unit may be a global positioning system (GPS) receiver or other unit capable of determining a geographic location of a receiver antenna. A user, through the use of a desktop computer and modem, transmits the location data to the implementing server which accesses data records which are indexed by location. The user is then presented with a list of references which were located within the geographic location specified. From the list, the user then selects the specific product or manufacturer in which they want to receive information from. The server is programmed to then perform a search of the global computer network or databases contained, in local server storage devices to locate websites relating to or operated by the manufacturer. Additionally, the server may search the global computer network on a product basis to locate other sites containing similar product information. The server can accordingly quickly assemble a collection of product related and manufacturer information. Preferably, the assembled information will provide the user with the name of the source for purchasing a particular product, and, further, the server will automatically link the computer with the source's website on a global computer network, or pre-arranged site on the server, to permit direct ordering.

In a typical application employing the system of the subject invention, a user is driving along a road and sees a billboard containing an advertisement for a new hotel. The user is interested in additional information on this hotel. The user notes the city that the billboard is in and some keywords on the billboard. The user then returns to a land-based global computer terminal, i.e., a computer with an Internet browser, and goes to a designated site on the Internet and enters in the city, from a national list of cities, and the keywords. The user now transmits this information to the global computer network and the implementing server returns additional information on the advertisement.

Information options can include the ability of the user to receive more information on the advertisement, e-mail the advertiser or e-mail the advertisement to any other address on the global computer network. Further, the user can request additional information on the products in the advertisement and purchase the product from the manufacturer or any source selling the product.

In an enhancement of the system, the geographic location of the advertisement can be determined based on a location determination unit. Location determination units are well known in the art and their positioning information may be obtained from a GPS satellite, a Glonass satellite, a Pseudolite or by triangulation. As a user is driving along a road and sees the billboard containing an advertisement, the user may initiate the location determination unit to determine the exact location of the advertisement. By more accurately obtaining the location through the location determination unit, the system will operate more efficiently by narrowing the list of references found in the exact location.

The location determination unit may be incorporated into an automobile or may be part of a mobile computing device. The mobile computing device may be a notebook computer, laptop computer, or personal digital assistant (PDA). In a situation where the location determination unit is incorporated into a mobile computing device, as the user identifies a billboard or advertisement that they are interested in, the location determination unit obtains positioning information of the billboard and sends it to the mobile computing device for storage in its memory. At a later time the mobile computing device may connect to a land-based computer via a docking port or other coupling arrangement to synchronize the positioning data with the land-based computer. The land-based computer will then access the system for product and manufacturer information as described above.

As another enhancement of the system, the mobile computing device comprises a wireless communication means to access the implementing server or the Internet. The above-mentioned computing means, i.e., laptop or PDA, can incorporate a wireless communication link through a cellular telephone or wireless cellular modem. In addition to the above-mentioned computing means, an Internet-enabled wireless application protocol (WAP) phone may be incorporated into the location determination unit under this embodiment of the present invention.

In this preferred embodiment, as a user identifies the advertisement of interest, the system is initiated to determine the location of the advertisement. The positioning information determined by the location determination unit is then communicated to the mobile computing device which, in turn, is transmitted via its wireless communication link to the implementing server or Internet. The implementing server then indexes the geo-coded database for the data record pertaining to the advertisement. When the information is found, it is transmitted back to the mobile computing device for the user to view and interact at the point of advertisement and in real time.

These and other features of the present invention will become apparent from the following detailed description considered in connection with the accompanying drawings. It should be understood, however, that the drawings are design for the purpose of illustration only and not as a definition of the limits of the invention.

DETAILED DESCRIPTION OF THE PREFERRED EMBODIMENTS

Figures 1, 2:
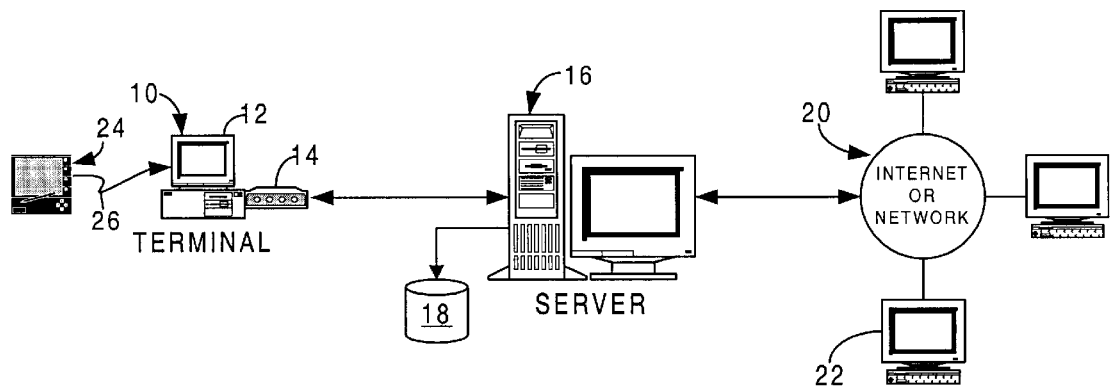
FIG. 1 is a diagram illustrating a system in accordance with the present invention.
FIG. 2 is a diagram illustrating the principal data structures used to implement the search system contemplated by the present invention.

Referring to the FIGS., the present invention is directed to providing an electronic or computerized search system that interacts primarily with global computer networks, particularly the Internet, using geographic locations of advertising media to rapidly and effectively obtain a supply of product-related information for presentation to a user. In accordance with the invention, as shown in FIG. 1, an individual, using a suitable terminal 10, typically a desktop computer 12 and modem connection 14, can access an implementing server 16 which is provided with a geo-coded database 18 linking product and manufacturer information to geographic locations of advertising media related to such product and manufacturer. Information relating to a particular product and its manufacturer is obtained when a user enters location data relating to a billboard or signage, whether outdoors or indoors, in which the user has been exposed to outside their normal computing environment, i.e., the home or office. Location data 50 can be entered into the computer 12 through manual input of data relating to the city 56, an approximate location 58 or zip code 60 of the billboard. Alternatively, the location of the advertising media can be obtained by a location determination unit. A user, through the use of a desktop computer 12 and modem 14, transmits the location data 50 to the implementing server 16 which accesses data records 50 which are indexed by location. The user is then presented with a list of references which are located within the geographic location specified. From the list, the user then selects the specific product or manufacturer in which they want to receive information from. The server 16 is programmed to then perform a search of the global computer network 20 or databases 18 contained in local server stores devices to located websites relating to or operated by the manufacturer. Additionally, the server 16 may search the global computer network 20 on a product basis to locate other sites containing similar product information. The server 16 can accordingly quickly assemble a collection of product related and manufacturer information. Preferably, the assembled information will provide the user with a name of the source for purchasing a particular product, and further, the server 16 will automatically link the computer 12 with the source's website on a global computer network 20 or pre-arranged site on the server 16, to permit direct ordering.

The implementing server 16 of the subject invention comprises a geo-coded database 18 which links product and manufacturer information to geographic locations of advertising media. The geo-coded database 18 is composed of a plurality of data records 50 as shown in FIG. 2. These data records 50 include various location indicators such as city 56, state 58, and zip code 60. The data records 50 further include location information pertaining to block 62, lot 64, latitude 66, and longitude 68 which will be utilized when the system is used in conjunction with a location determination unit, which will be described below. In assembling the database 18, a content producer, or advertiser, will put standard information links (URLs 52 or information content 54) onto a computer server 22 that accesses the global computer network 20. These addresses 52 or information content 54 will be cross-related to the billboard/signage content by the location data 56–68 of the billboard or signage. To illustrate, suppose the content manager of Hilton wanted to link a Hilton billboard located in North Miami, Fla. The content manger will provide to the server 16 the information shown in the data record of FIG. 2. The content manager will then give the computer server 16 the content that he wants linked to the data record 50. The computer server 16 will then place the content at a central site that is accessible from the interactive search system of the subject invention. A server administrator would then code the link by the above supplied information. For example, the unique code might be: billboard/33138/hilton,resort/hilton.com/aventura. Preferably, the content producer or advertiser will place a marking icon on the billboard signifying that linked information is available.

In a typical application employing the system of the subject invention, a user is driving along and sees a billboard containing an advertisement for a new hotel. The user is interested in additional information on this hotel. The user notes the city 56 that the billboard is in and some keywords 54 on the billboard. The user then returns to a land-based global computer terminal 12, i.e., a computer with an Internet browser. He goes to a designated site on the Internet 20 and enters in the city 56, from a national list of cities, and the keywords 54. The terminal 12 through communication means 14 transmits the input data to server 16. The server 16 would then look up in its database 18 to find any items matching the requested item. The server 16 may resolve the request with several items that match because several coded items may be in the same approximate geographic location. The user will then be given the choice by name to select the item of interest, for example:

Hilton Hotel
Picasso Dry Cleaner's
Frank's Bar and Grill

The user will then receive or select the item of interest and be able to further access additional content. Information options can include the ability of the user to receive more information on the advertisement, e-mail the advertiser or e-mail the advertisement to another address on the global computer network 20. Further, the user can request additional information on the product and advertisement and purchase the product from the manufacturer or any source selling the product.

In an enhancement of the system, the geographic location of the advertisement can be determined based on a location determination unit. Location determination units are well know in the art and their positioning information may be obtained from a GPS satellite, a Glonass satellite, a Pseudolite or by triangulation. As a user is driving along a road and sees a billboard containing an advertisement, the user may initiate the location determination unit to determine the exact location of the advertisement. By more accurately obtaining the location through the location determination unit, the system will operate more efficiently by narrowing the list of references found in a location. The location determination unit may be incorporated into automobile or may be part of a mobile computing device 24. The mobile computing device may be a notebook computer, laptop computer, or personal digital assistant (PDA).

In a situation where the location determination unit is incorporated into a mobile computing device 24 (for example, Palm™ V), as the user identifies a billboard or advertisement that they are interest in, the location determination unit obtains positioning information of the billboard and sends it to the mobile computing device 24 for storage in its memory. At a later time, the mobile computing device 24 may connect to a land base computer 12 via a docking port or other coupling arrangement 26 to synchronize the positioning data with the land-based computer 12. The land-based computer will then access the system for product and manufacturer information as described above.

Figure 3:
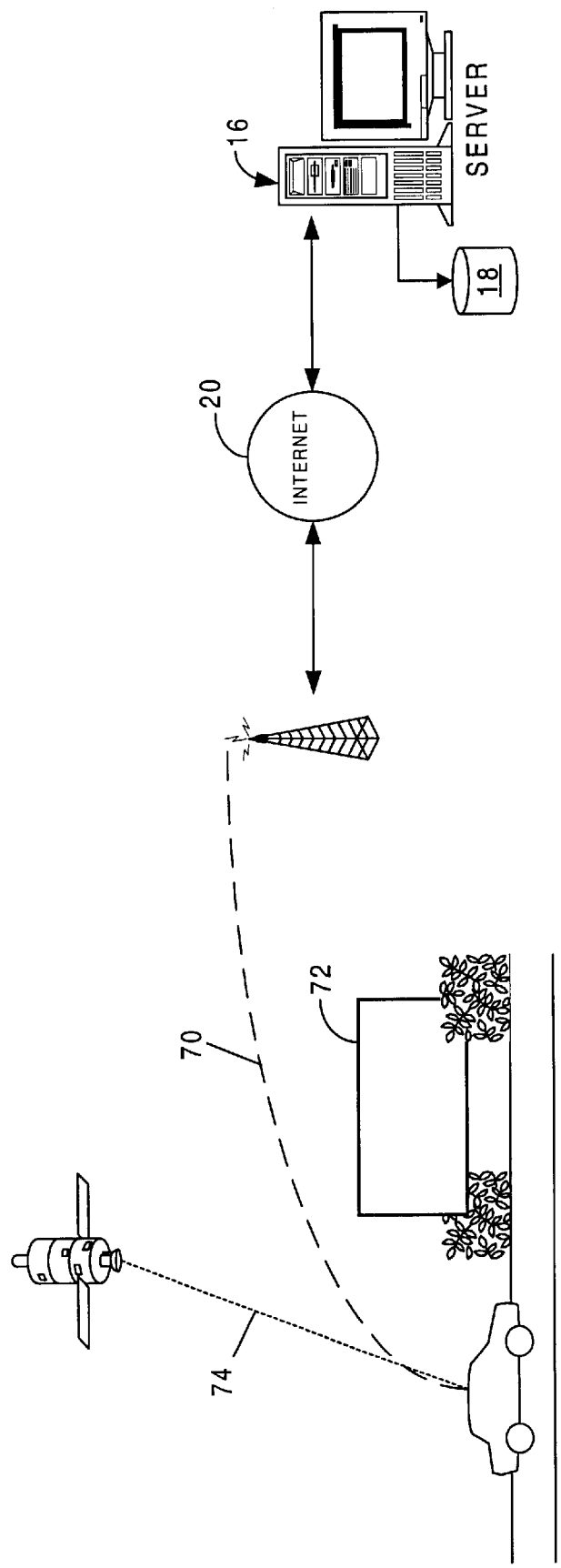
FIG. 3 is a schematic diagram illustrating a prefer embodiment of the system in accordance with the present invention where product-related information can be accessed at the point of advertisement.

In the preferred embodiment as shown in FIG. 3, the mobile computing device comprises a two-way wireless communication link 70 to access the implementing server 16 directly or indirectly through the Internet 20. The above-mentioned computing means, i.e., laptop or PDA, can incorporated a wireless communication link 70 through a cellular telephone or wireless cellular modem. An example of such computing means is a Palm™ VII hand-held device. In addition to the above-mentioned computing means, an Internet-enabled wireless application protocol (WAP) phone may be incorporated into the location determination unit under this embodiment of the present invention. As a user identifies the advertisement of interest, the system is initiated to determine the location of the advertisement 72. The positioning information 74 determined by the location determination unit is then communicated to the mobile computing device, which in turn, is transmitted via it wireless communication link 70 to the implementing server 16 or Internet 20. The implementing server 16 then indexes the geo-coded database 18 for the data record 50 pertaining to the advertisement 72. When the information is found, it is transmitted back to the mobile computing device for the user to view and interact at the point of advertisement 72 and in real time.

It should be understood that methods and apparatus described above are merely illustrative applications of the principal of the present invention. Numerous modifications may be made by those skill in the art without departing from the true spirit and scope of the invention.

What is claimed is:

1. An interactive search system for obtaining a supply of information from a global computer network for presentation to a user, said information relating to particular advertising media found in a particular geographic location, said system comprising:

an implementing server coupled to the global computer network and comprising database means for storing search-object-related information relating to advertising media and related geographic locations and associated information on where further search-object-related information relating to said advertising media can be located on the global computer network;

a computer input terminal coupled to said implementing server and operable by a user to send input data for accessing said implementing server, said input data comprising indicators of said particular advertising media and particular geographic location addressing said stored search-object-related information;

means, responsive to said input data, for activating said implementing server to use said associated information to access said further search-object-related information on the global computer network to obtain a supply of information relating to said particular advertising media; and means for collecting and storing at said computer input terminal said further search-object-related Information accessed by said implementing server to provide a supply of search-object-related information relating to said particular advertising media from the global computer network ready for presentation to the user in accordance with the input data comprising indicators of said particular advertising media and said particular geographical location.

2. A system as in claim 1, wherein said database means comprises a geo-coded link, and said link cross references location data with said search-object-related information.

3. A system as in claim 1, further comprising means for directly linking said implementing server to certain sites on the global computer network.

4. A system as in claim 1, further comprising means directly linking said computer input terminal to certain sites on the global computer network.

5. A system as in claim 1, wherein said particular advertising media is disposed on a billboard or signage of any nature.

6. A system as in claim 1, wherein said advertising media comprises an icon indicating said search-object-related information is available.

7. A system as in claim 1, wherein said search-object-related information comprises product-related information.

8. A system as in claim 1, wherein said input data comprises an indicator of a city selected from a list of national cities.

9. A system as in claim 1, wherein said input data comprises an indicator of a state.

10. A system as in claim 1, wherein said input data comprises an indicator of a zip code.

11. A system as in claim 1, wherein said input data comprises keywords printed on said advertising media.

12. A system as in claim 1, wherein said input data comprises an indicator of a block and lot location.

13. A system as in claim 1, wherein said input data comprises an indicator of a latitude and a longitude.

14. A system as in claim 1, wherein said input data is obtained by a location determination unit.

15. A system as in claim 1, wherein said computer input terminal comprises a mobile computing means.

16. A system as in claim 1, wherein said computer input terminal comprises a portable computer.

17. A system as in claim 1, wherein said computer input terminal comprises a personal digital assistant.

18. A system as in claim 1, wherein said computer input terminal comprises an internet-enabled wireless application profile phone.

19. A system as in claim 1, wherein said computer input terminal comprises a server accessible phone.

20. A system as in claim 1, wherein said computer input terminal comprises a location determination unit.

21. A system as in claim 1, wherein said computer input terminal comprises a two-way wireless communication link.

22. A system as in claim 1, wherein said system is integrated in a vehicle.

23. An interactive search method for obtaining a supply of information relating to the object of a search from a global computer network for presentation to a user, said search object being information regarding particular advertising media that is disposed in a particular geographic location, comprising the steps of:

inputting, by means of an electronic terminal, input data containing indicators relating to the object of the search, to an implementing server containing databases storing search-object-related data records, relating advertising media identified by the input data indicators to web sites on a global computer network, along with further information as to where data records of interest relating to said advertising media can be located on the global computer network;

firstly querying said databases of said implementing server with input data having search-object-related indicators relating to information regarding the particular advertising media and its particular geographic location to find websites on the global computer network with data records containing information related to said input data search-object-related indicators;

secondly querying said databases of said implementing server to find websites in the global computer network containing said further information related to said data records of interest; and transferring all of the information regarding the particular advertising media relating to the object of the search that results from said second querying of the websites, to said electronic terminal for storing and providing a supply of information regarding the object of the search obtained from the global computer network ready for presentation to the user in accordance with the input data.

24. The method of claim 23, wherein said database comprises a geocoded link, and said link cross references geographic location data with said object of the search information.

25. The method of claim 23, further comprising the step of directly linking said implementing server to certain sites on the global computer network.

26. The method of claim 23, further comprising the step of directly linking said electronic terminal to certain sites on the global computer network.

27. The method of claim 23, wherein said information regarding the object of the search comprises product-related advertising media.

28. The method of claim 23, wherein said particular advertising media is disposed on a billboard or signage of any nature.

29. The method of claim 23, wherein said particular advertising media comprises an icon indicating information is available.

30. The method of claim 23, wherein said input data comprises an indicator of a city selected from a list of national cities.

31. The method of claim 23, wherein said input data comprises an indicator of a state.

32. The method of claim 23, wherein said input data comprises an indicator of a zip code.

33. The method of claim 23, wherein said input data comprises keywords printed on said particular advertising media.

34. The method of claim 23, wherein said input data comprises an indicator of a block and lot location.

35. The method of claim 23, wherein said input data comprises an indicator of a latitude and a longitude.

36. The method as in claim 23, wherein said input data is obtained by a location determination unit.

37. The method as in claim 23, wherein said electronic terminal comprises a mobile computing means.

38. The method as in claim 37, wherein said mobile computing means is a portable computer.

39. The method as in claim 37, wherein said mobile computing means is a personal digital assistant.

40. The method as in claim 37, wherein said mobile computing means is an Internet-enabled wireless application protocol phone.

41. The method as in claim 37, wherein said mobile computing means is a server accessible phone.

42. The method as in claim 37, wherein said mobile computing means comprises a location determination unit.

43. The method as in claim 42, wherein said mobile computing means comprises a two-way wireless communication link.

* * * * *